United States Patent
Kawai et al.

(10) Patent No.: US 9,328,686 B2
(45) Date of Patent: May 3, 2016

(54) FLOW MEASURING DEVICE

(71) Applicant: Mitsubishi Electric Corporation, Chiyoda-ku, Tokyo (JP)

(72) Inventors: Masahiro Kawai, Chiyoda-ku (JP); Naoki Morinaga, Chiyoda-ku (JP); Kazuhiko Otsuka, Chiyoda-ku (JP); Yuji Ariyoshi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 57 days.

(21) Appl. No.: 14/491,283

(22) Filed: Sep. 19, 2014

(65) Prior Publication Data

US 2015/0330324 A1 Nov. 19, 2015

(30) Foreign Application Priority Data

May 19, 2014 (JP) ................................. 2014-102973

(51) Int. Cl.
*F02D 41/18* (2006.01)
*G01F 1/69* (2006.01)

(52) U.S. Cl.
CPC . *F02D 41/18* (2013.01); *G01F 1/69* (2013.01)

(58) Field of Classification Search
CPC ......... G01F 1/6842; G01F 5/00; G01F 1/692; F02D 41/18; F02D 2200/0406; G01M 15/09
USPC ............................... 73/114.32, 114.34, 202.5
See application file for complete search history.

(56) References Cited

U.S. PATENT DOCUMENTS

| | | | | |
|---|---|---|---|---|
| 6,571,621 B2 * | 6/2003 | Watanabe | ............. | G01F 1/6842 73/202.5 |
| 7,059,183 B2 * | 6/2006 | Kikawa | ................. | G01F 1/6842 73/114.34 |
| 7,216,535 B2 * | 5/2007 | Kikawa | ................. | G01F 1/6842 73/114.33 |
| 7,530,267 B2 * | 5/2009 | Uramachi | ............. | G01F 1/6842 73/202.5 |
| 8,511,158 B2 * | 8/2013 | Kishikawa | ............ | G01F 1/6842 73/204.22 |
| 2002/0116995 A1 | 8/2002 | Watanabe et al. | | |
| 2007/0068246 A1 | 3/2007 | Uramachi | | |

FOREIGN PATENT DOCUMENTS

| | | |
|---|---|---|
| JP | 2001-124606 A | 5/2001 |
| JP | 2006-138688 A | 6/2006 |
| JP | 3782669 B2 | 6/2006 |
| JP | 4161077 B2 | 10/2008 |

* cited by examiner

*Primary Examiner* — Freddie Kirkland, III
(74) *Attorney, Agent, or Firm* — Sughrue Mion, PLLC; Richard C. Turner

(57) ABSTRACT

A detection element portion is provided on an inner surface side of a plate as a wall surface portion defining a measurement passage in a flow measuring device. An intake-air temperature detection portion detecting a temperature of a fluid being measured is provided on one main surface of a substrate forming the detection element portion. A ventilation hole allowing a main passage in which the fluid being measured flows and the measurement passage to communicate is provided so as to penetrate through the plate. By achieving a state in which the substrate forming the detection element portion is installed so that an end thereof protrudes into the ventilation hole and a back surface of the end portion of the detection element portion where the intake-air temperature detection portion is formed is exposed toward the main passage, a response speed is enhanced.

9 Claims, 9 Drawing Sheets

FLOW MEASURING DEVICE

BACKGROUND OF THE INVENTION

1. Field of the Invention

The present invention relates to a flow measuring device, and, for example, to a device used to measure an intake-air flow rate and an intake-air temperature of an internal combustion engine.

2. Description of the Related Art

A flow measuring device in the related art is configured to have a measurement passage to let in a part of intake air flowing through a main passage, so that a flow rate detection element measuring a flow rate is installed in the measurement passage and further an intake-air temperature detection element measuring an intake-air temperature is installed in the measurement passage or the main passage.

A semiconductor device having a flow rate detection portion formed of a thin film with a thickness of a micron order is used as the flow rate detection element and a thermistor is used as the intake-air temperature detection element.

A support member is normally provided for installation of the intake-air temperature detection element. However, heat transmitted from the support member has an influence on detection accuracy of the intake-air temperature. Also, when a support member with low heat conductivity is used, a cost reduction becomes difficult.

To overcome such an inconvenience, a structure as follows is proposed as a flow measuring device capable of enhancing measurement accuracy of an intake-air temperature and reducing costs at the same time, and further achieving high robustness and high reliability.

The flow measuring device in the related art reduces influences of heat transmitted from the support member to the detection element by installing the intake-air temperature detection element in a bent measurement passage and thereby separating a connector terminal and a support terminal (see, for example, Patent Document 1).

Also, the flow measuring device in the related art reduces costs by installing the flow rate detection element and the intake-air temperature detection element on a single substrate and integrating the both into one piece.

Further, in the case of a detection element having the flow rate detection element and the intake-air temperature detection element formed on a single substrate, a speed of response to an intake-air temperature is enhanced by forming the intake-air temperature detection element on a diaphragm and reducing heat capacities of the intake-air temperature detection element and the support member including a substrate portion on which the intake-air temperature detection element is installed (see, for example, Patent Document 2).

Further, in the flow measuring device in the related art, a hole connecting the measurement passage and the main passage is provided to a cover portion near downstream of the detection element installed at a position on a plane same as one wall surface that defines the measurement passage (see, for example, Patent Document 3).

In addition, the flow measuring device in the related art has a hole provided upstream of the flow rate detection element installed in the measurement passage so as to penetrate through the measurement passage and the main passage. Hence, adhesion of water to the flow rate detection element is prevented by discharging water penetrating into the measurement passage to the main passage side (see, for example, Patent Document 4).

[Patent Document 1] JP-A-2001-124606
[Patent Document 2] JP-A-2006-138688
[Patent Document 3] Japanese Patent No. 4161077
[Patent Document 4] Japanese Patent No. 3782669

As has been described above, the structure to enhance detection accuracy of the detection element that detects an intake-air temperature is proposed for the flow measuring device in the related art. According to the techniques in Patent Documents 1 through 4, however, a heat capacity in the measurement passage in which to install the intake-air temperature detection element is so large that a response of a temperature detected in the measurement passage lags behind a response of the temperature in the main passage. Hence, the related art has a problem that even when measurement accuracy of the intake-air temperature detection element itself is enhanced, desired detection accuracy of the intake-air temperature cannot be obtained.

SUMMARY OF THE INVENTION

The invention was devised to solve the problems discussed above and has an object to provide a highly-accurate flow measuring device with excellent robustness and reliability by improving a speed of response to an intake-air temperature.

A flow measuring device according to one aspect of the invention includes: a main body portion extended into a main passage in which a fluid being measured flows and provided with a circuit storing portion internally; a measurement passage forming portion formed on an extension side of the circuit storing portion in the main body portion and provided with a measurement passage in which to let a part of the fluid being measured flow; a detection element portion provided on an inner surface side of a wall surface portion defining the measurement passage of the measurement passage forming portion, and provided with an intake-air temperature detection portion detecting a temperature of the fluid being measured and a flow rate detection portion detecting a flow rate, both of which are formed on one main surface of a same substrate; and a ventilation hole penetrating through the wall surface portion of the measurement passage forming portion and allowing the main passage and the measurement passage to communicate. The detection element portion is installed so that an end thereof protrudes into the ventilation hole. A back surface of the end of the detection element portion where the intake-air temperature detection portion is formed is exposed toward the main passage.

According to the flow measuring device configured as above, by providing the ventilation hole penetrating through the measurement passage and the main passage, not only can let intake air on the main passage side flow to the intake-air temperature detection portion, but also a heat capacity in the measurement passage can be smaller. Further, by installing the detection element portion so that an end thereof protrudes into the ventilation hole, it becomes possible to achieve a state in which the back surface of the end of the detection element portion where the intake-air temperature detection portion is formed is exposed toward the main passage. Hence, a speed of response to an intake-air temperature can be improved by reducing thermal influences on the intake-air temperature detection portion from the wall surface portion. It thus becomes possible to obtain a highly-accurate flow measuring device with excellent robustness and reliability.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
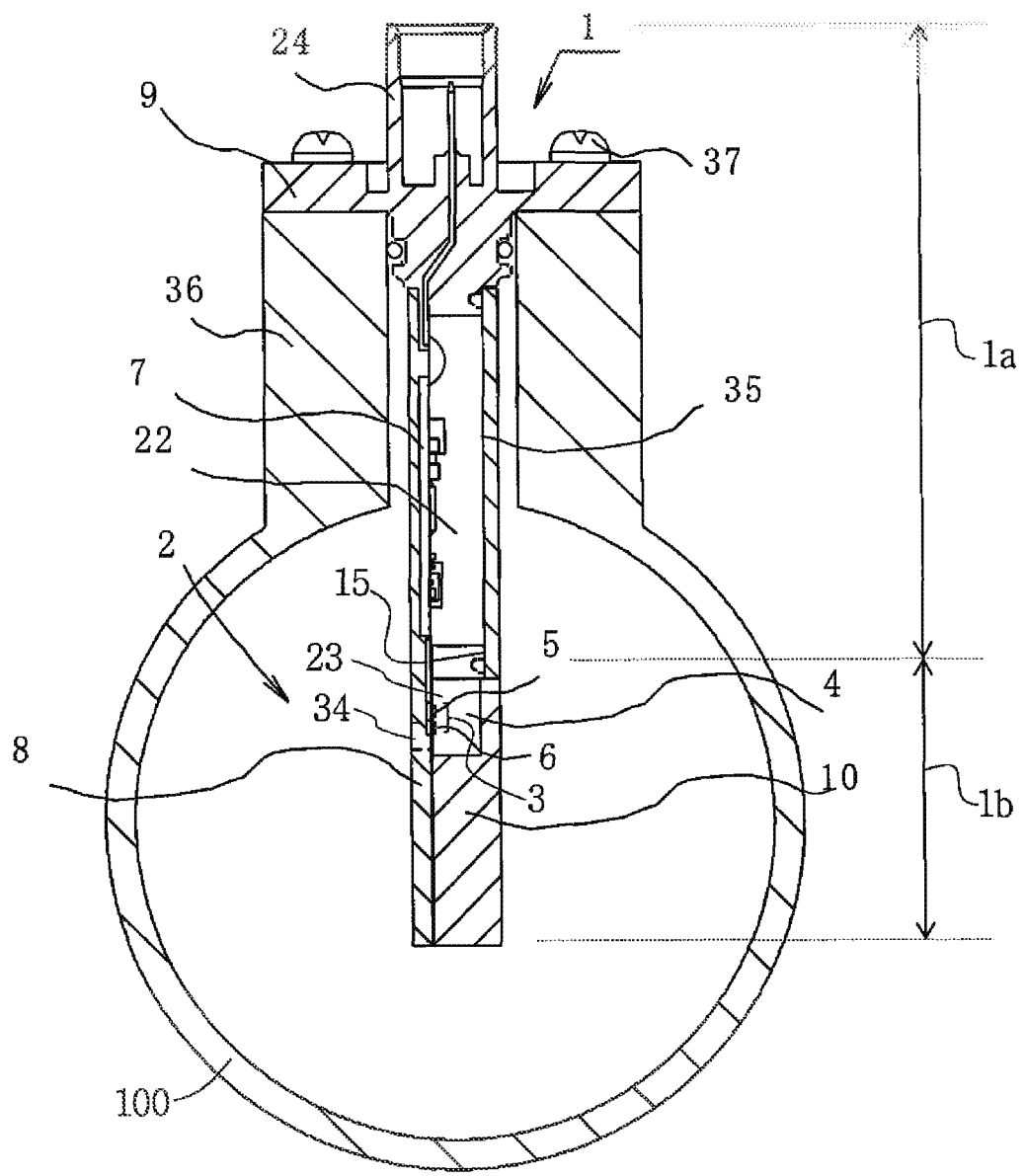
FIG. 1 is a sectional side view in a direction perpendicular to a main passage showing a state in which a flow measuring device according to a first embodiment of the invention is attached to the main passage.
Figure 2:
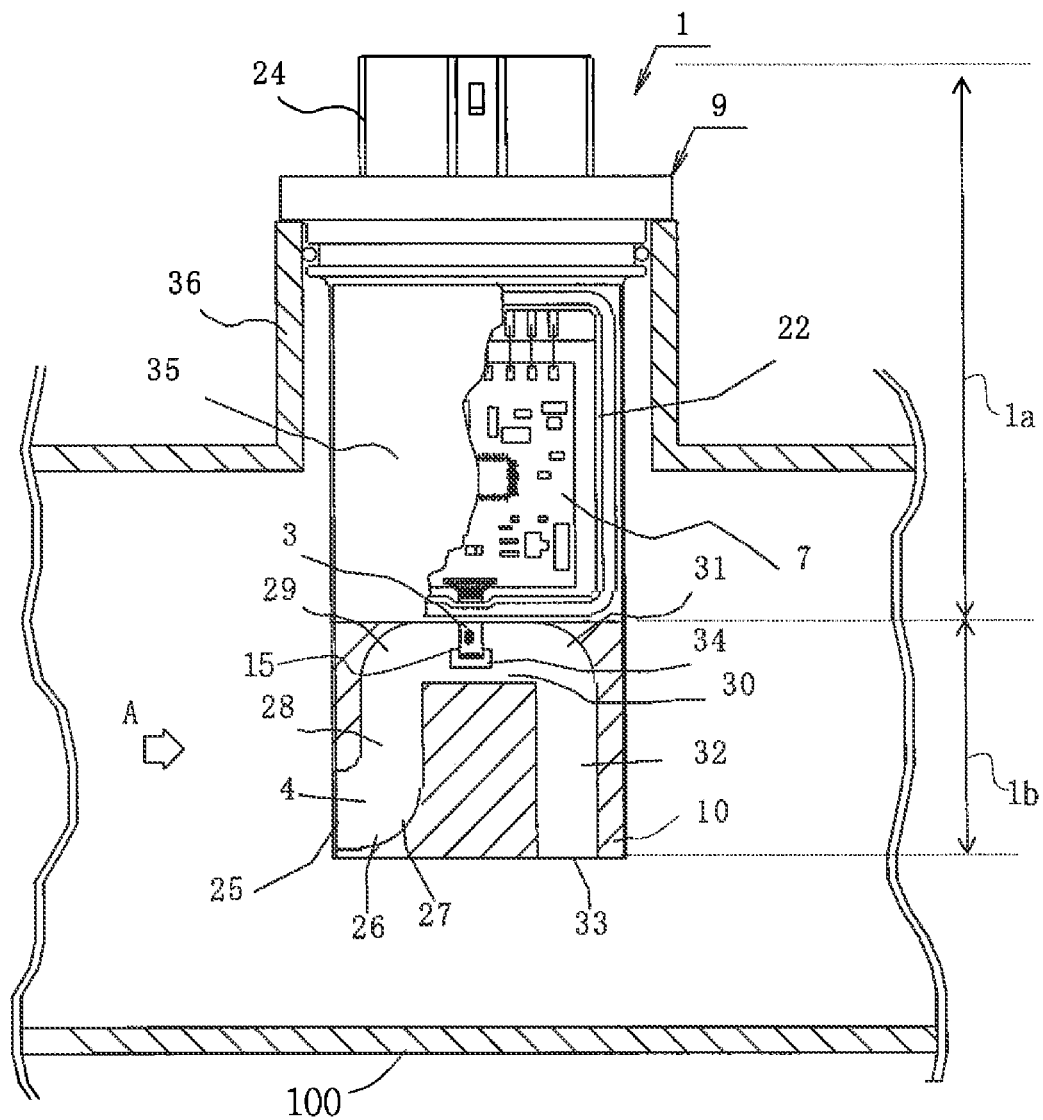
FIG. 2 is a sectional side view parallel to the main passage showing a state in which the flow measuring device according to the first embodiment of the invention is attached to the main passage.
Figure 3:
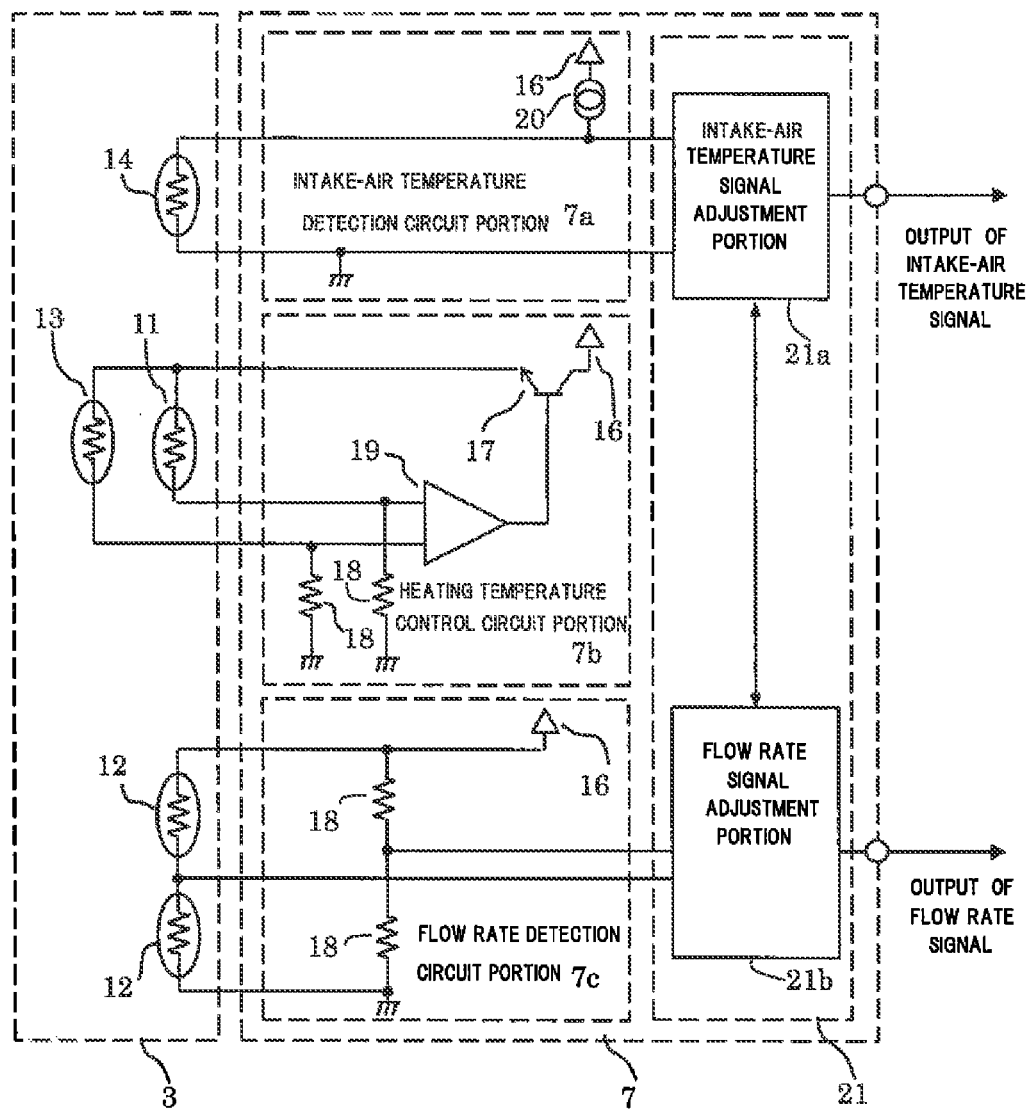
FIG. 3 is a circuit diagram of the flow measuring device according to the first embodiment of the invention.
Figure 4A:
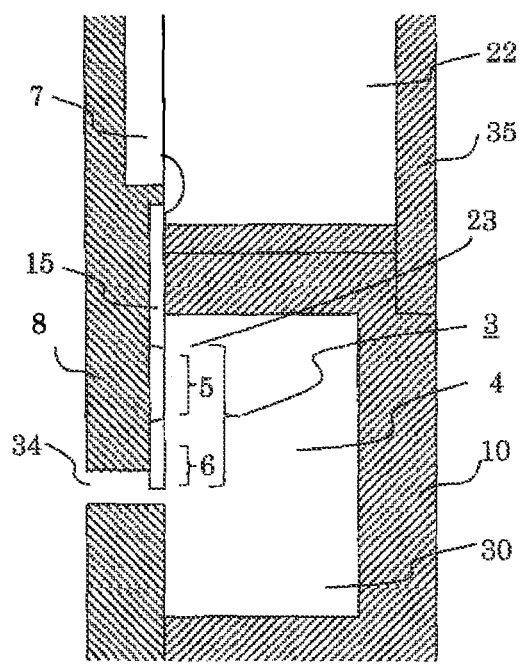
FIG. 4A is a sectional side view of a major portion perpendicular to the main passage showing a detection element portion of FIG. 1 and a periphery thereof.
Figure 4B:
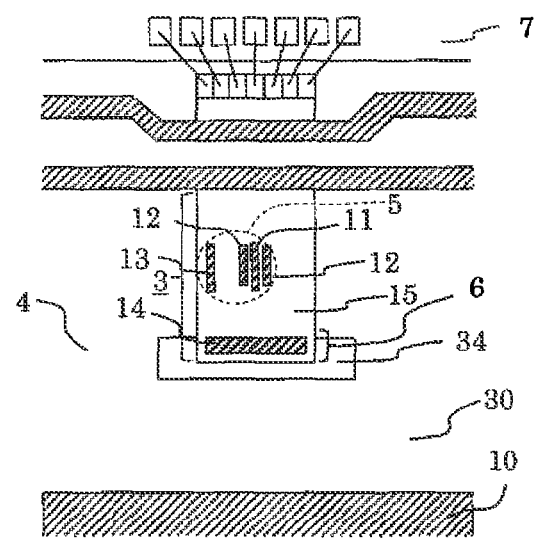
FIG. 4B is a sectional side view of the major portion parallel to the main passage.
Figure 5:
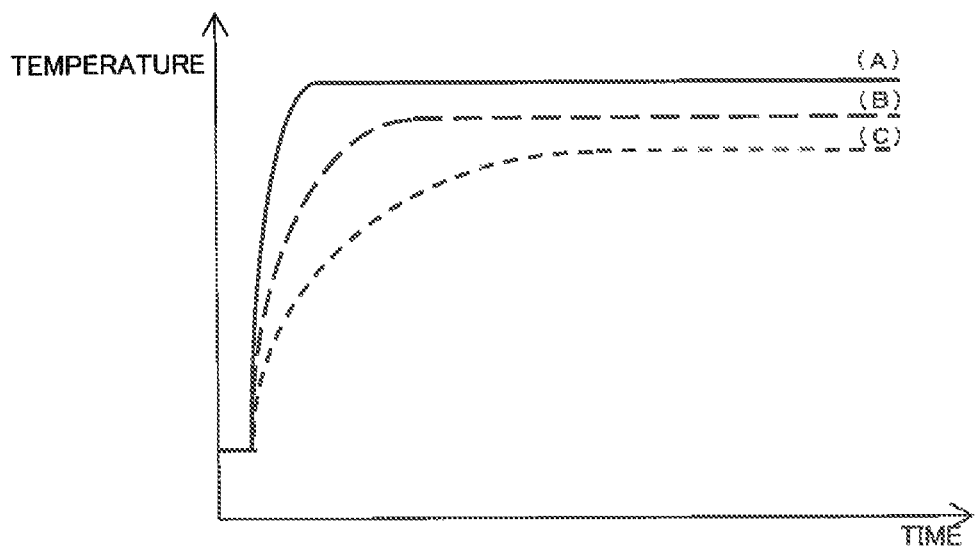
FIG. 5 is a view showing response characteristics of an intake-air temperature detection portion according to the first embodiment of the invention.

A flow measuring device according to a first embodiment of the invention will be described using FIG. 1 through FIG. 5. FIG. 1 is a sectional side view perpendicular to a flow direction of a main passage 2 in a tube 100 in which a fluid being measured flows, and shows a state in which a flow measuring device 1 of the first embodiment is inserted into and attached to the main passage 2 so as to extend into the the main passage 2. FIG. 2 is a sectional side view along the flow direction of the main passage 2 and shows a major portion in a state in which the flow measuring device 1 is attached to the main passage 2. FIG. 3 is a circuit diagram schematically showing a configuration of a detection portion of the flow measuring device 1. FIG. 4A is a sectional side view of a major portion perpendicular to the flow direction of the main passage 2 and shows a detection element portion 3 of FIG. 1 and a periphery thereof. FIG. 4B is a sectional side view of the major portion parallel to the flow direction of the main passage 2 and shows the detection element portion 3 and a periphery thereof. FIG. 5 is a view used to describe an advantage of improving a response speed of an intake-air temperature detection portion 6 in the flow measuring device 1 of the first embodiment. For example, a main stream (flow direction) of the fluid being measured flows in a direction indicated by an arrow A of FIG. 2.

As are shown in FIG. 1 and FIG. 2, the flow measuring device 1 is fit to the tube 100 and used to measure a flow rate and a temperature of the fluid being measured in the tube 100. The flow measuring device 1 is formed of a main body portion 1a nearer to a tube fixing portion, which is a flat plate portion inserted and extended in the tube 100, and a measurement passage forming portion 1b, which is a tip end side inserted into the tube 100. The main body portion 1a is extended into the main passage 2 in which the fluid being measured flows and provided with a circuit storing portion 22 internally. The measurement passage forming portion 1b is formed on an extension side of the circuit storing portion 22 in the main body portion 1a and provided with a measurement passage 4 in which to let a part of the fluid being measured flow. Further, a detection element portion 3 is provided on an inner surface side of a plate 8, which is a wall surface portion defining the measurement passage 4 of the measurement passage forming portion 1b. The detection element portion 3 has an intake-air temperature detection portion 6 detecting a temperature of the fluid being measured and a flow rate detection portion 5 detecting a flow rate, both of which are formed on one main surface of a same substrate 15.

FIGS. 4A and 4B are enlarged sectional side views of the major portion, that is, the detection element portion 3 and a periphery thereof. As are shown in these drawings, the flow measuring device 1 of the invention is characterized in that a ventilation hole 34 allowing the main passage 2 and the measurement passage 4 to communicate is provided so as to penetrate through the plate 8, which is a wall surface portion of the measurement passage forming portion 1b. It is configured in such a manner that an end (tip end side inserted into the tube 100) of the detection element portion 3 is installed so as to protrude into the ventilation hole 34, and that a back surface of the end of the detection element portion 3 where the intake-air temperature detection portion 6 is formed is exposed toward the main passage 2.

Also, as is shown in FIG. 1 and FIGS. 4A and 4B, a plane of the plate 8, which is the wall surface portion defining the measurement passage 4, is installed in the main passage 2 to be parallel to the flow direction of the main passage 2 and the ventilation hole 34 opens perpendicularly to the flow direction. Also, as are shown in FIG. 1 and FIG. 2, the flow measuring device 1 is fixed to the tube 100 with the main body portion 1a on an upper side and the measurement passage forming portion 1b on a lower side.

Further, as is shown in FIG. 4B, an intake-air temperature detection resistor 14 forming the intake-air temperature detection portion 6 is installed on an extension of an opening of the ventilation hole 34. The flow measuring device 1 is in a state in which a back surface (a measurement surface exposed to the measurement passage 4 is given as the main surface) of the substrate 15 on which to mount the intake-air temperature detection resistor 14 is exposed toward the main passage 2 via the ventilation hole 34. For example, in order to prevent the intake-air temperature detection resistor 14 from being superimposed on the plate 8 via the substrate 15, the substrate 15 is installed so that an entire region where the intake-air temperature detection resistor 14 is installed is superimposed on the ventilation hole 34.

The ventilation hole 34 opened in the plate 8 is formed in a size large enough to surround the region where the intake-air temperature detection resistor 14 of the detection element portion 3 is installed and a peripheral space. Herein, the ventilation hole 34 is opened wider than the substrate 15 forming the detection element portion 3 in the flow direction.

The flow measuring device 1 of the invention will now be described more in detail. Referring to FIG. 1 through FIG. 4B, the main passage 2 is an internal channel of the tube 100 of a cylindrical shape in which the fluid being measured passes by. In the case of an internal combustion engine for automobile, the main passage 2 is normally a channel in an intake duct formed integrally with an intake air filtering device (not shown) and the fluid being measured is air. The main passage 2 is provided with an insertion hole to plug in the flow measuring device 1.

The flow measuring device 1 has the measurement passage 4 provided in the main passage 2 to let a part of the fluid being measured flow therein, the detection element portion 3 including the flow rate detection portion 5 detecting a flow rate of the fluid being measured flowing through the measurement passage 4 and the intake-air temperature detection portion 6 measuring a temperature of the fluid being measured, both of which are formed on the same substrate 15, a circuit board 7 having a control circuit formed to process a flow rate detection signal and an intake-air temperature detection signal by driving the flow rate detection portion 5 and the intake-air temperature detection portion 6, the plate 8 holding the detection element portion 3 and the circuit board 7, a base 9 supporting the plate 8, and a measurement passage defining cover 10 provided in close proximity to the base 9 and defining the measurement passage 4 in cooperation with the plate 8.

As is shown in the sectional side view of the detection element portion 3 of FIG. 4B, the detection element portion 3 includes the flow rate detection portion 5 and the intake-air temperature detection portion 6. The flow rate detection portion 5 includes a heating resistor 11 used to detect a flow rate of the fluid being measured, heating temperature detection resistors 12 installed upstream and downstream of the heating resistor 11 in the flow direction of the fluid being measured, and a temperature compensation resistor 13 detecting a temperature of the fluid being measured and making a temperature compensation for a flow rate detection. The intake-air temperature detection portion 6 includes the intake-air temperature detection resistor 14 used to detect a temperature of the fluid being measured. The flow rate detection portion 5 and the intake-air temperature detection portion 6 are formed on the surface of the substrate 15 of a rectangular plate shape. Input and output terminals electrically connected to the heating resistor 11, the heating temperature detection resistors 12, the temperature compensation resistor 13, and the intake-air temperature detection resistor 14 are formed on one side of the surface of the substrate 15 and connected to the circuit board 7.

The heating resistor 11, the heating temperature detection resistors 12, the temperature compensation resistor 13, the intake-air temperature detection resistor 14, and the input and output terminals are formed by patterning a heat-sensitive resistance film made of platinum, nickel, iron, nickel alloy, or titanium and formed on the surface of the substrate 15. The flow rate detection portion 5, which is a region where the heating resistor 11, the heating temperature detection resistors 12, and the temperature compensation resistor 13 are formed, is of a diaphragm structure due to a cavity formed by eliminating the substrate 15 from the back surface side.

Further, an electrical insulating material, such as silicon and ceramic, is used as a material of the substrate 15. As with the flow rate detection portion 5, the intake-air temperature detection portion 6, which is a region where the intake-air temperature detection resistor 14 is formed, may also be of a diaphragm structure due to a cavity formed by eliminating the substrate 15 from the back surface side.

As is shown in the circuit diagram of the flow measuring device 1 of FIG. 3, the circuit board 7 forms an intake-air temperature detection circuit portion 7a, a heating temperature control circuit portion 7b, and a flow rate detection circuit 7c (described in detail below) using a constant voltage power supply 16, a transistor 17, fixed resistors 18, an operational amplifier 19, and a constant current source 20 as components, and further includes a characteristic adjustment circuit 21. The characteristic adjustment circuit 21 has an intake-air temperature signal adjustment portion 21a and a flow rate signal adjustment portion 21b.

The plate 8 is made of a plastic material shaped like a rectangular plate. The plate 8 cooperates with the measurement passage defining cover 10 laminated on the inner surface side, so that the circuit storing portion 22 (circuit board storing portion) and a detection element storing portion 23 are provided on the surface in a concave shape in close proximity to each other. The circuit board 7 is stored in the circuit storing portion 22 and fixed therein with an adhesive. The detection element portion 3 is stored in the detection element storing portion 23 with the input and output terminals positioned on the side of the circuit board 7 and fixed therein with an adhesive. It should be noted that the detection element storing portion 23 is a part of the measurement passage 4 and means a region where the detection element portion 3 is installed. In addition, the circuit board 7 and the detection element portion 3 are installed on a plane same as the surface (one main surface or inner surface) of the plate 8.

The base 9 used to fix the flow measuring device 1 to the tube 100 has a joint portion with a flange portion 36 to ensure airtightness when the detection portion is inserted into the main passage 2 and a connector portion 24 provided to the other side of the junction portion and enabling signal transmissions between the circuit board 7 and the outside. The base 9 has a connection portion to the circuit storing portion 22, which is provided from the joint portion toward the tube 100. The forgoing members are molded in one piece of resin, such as polybutylene terephthalate.

The circuit storing portion 22 in which to store the circuit board 7 is defined by being surrounded by the plate 8 elongated to the extension side and a cover 35. The plate 8 is bonded and fixed to the base 9. Herein, the flow measuring device 1 is in a state in which the circuit board 7 and the detection element portion 3 are attached to the plate 8, and the side of the plate 8, on which the input and output terminals of the circuit board 7 and the detection element portion 3 are present, is exposed in the circuit storing portion 22. The back surface of the tip end of the plate 8 is exposed toward the main passage 2.

The measurement passage defining cover 10 that defines the measurement passage 4 in cooperation with the plate 8 is molded from resin, for example, polybutylene terephthalate. One surface of the measurement passage defining cover 10 is fixed to a region on the inner side of the plate 8 extended from the base 9 with an adhesive. The measurement passage 4 is formed in a concave shape in one surface of the measurement passage defining cover 10. When the measurement passage defining cover 10 and the plate 8 are laminated, the both corporate with each other and define the measurement passage 4 having a rectangular passage cross section. The measurement passage defining cover 10 may be formed integrally with the base 9 from resin.

As is shown in FIG. 2, the measurement passage 4 includes an inlet 25, a first passage portion 26, a first bent portion 27, a second passage portion 28, a second bent portion 29, a third passage portion 30 in which to install the detection element portion 3, a third bent portion 31, a fourth passage portion 32, and an outlet 33, and is formed in a bent shape. The inlet 25 opens toward an upper stream in the main stream flow direction A in close proximity to an end of the flow measuring device 1 on the opposite side to the connector portion 24 to let the fluid being measured flow into the measurement passage 4. The outlet 33 opens in an end face of the flow measuring device 1 on the opposite side to the connector portion 24 to let the fluid being measured flow out from the measurement passage 4 to the main passage 2. In other words, the end face of the flow measuring device 1 on the opposite side to the connector portion 24 is a surface substantially parallel to the main stream flow direction A.

A flow in the measurement passage 4 will now be described more in detail. The first passage portion 26 is extended from the outlet 25 in the main stream flow direction A so as to reach the first bent portion 27. The second passage portion 28 is extended from the first bent portion 27 toward the circuit board 7 in a direction substantially orthogonal to the main stream flow direction A so as to reach the second bent portion 29. The third passage portion 30 is provided in close proximity to the circuit storing portion 22 and extended from the second bent portion 29 in the main stream flow direction A so as to reach the third bent portion 31. The fourth passage portion 32 is extended from the third bent portion 31 and away from the circuit board 7 in a direction substantially orthogonal to the main stream flow direction A so as to reach the outlet 33. The first bent portion 27, the second bent portion 29, and the third bent portion 31 are formed to bend the flow direction of the fluid being measured by substantially 90°.

The ventilation hole 34 is provided so as to penetrate through the plate 8 at a position in the end of the substrate 15 nearer to the detection element portion 3 and the circuit board 7 so as to allow the third passage portion 30 and the main passage 2 to communicate. The regions of the detection element portion 3 where the heating resistor 11, the heating temperature detection resistors 12, and the temperature compensation resistor 13 of the flow rate detection portion 5 are formed, and where the intake-air temperature detection resistor 14 of the intake-air temperature detection portion 6 is formed are exposed in the third passage portion 30 of the measurement passage 4.

As has been described, the ventilation hole 34 is formed at a position at which is installed the intake-air temperature detection resistor 14, which is a part of the intake-air temperature detection portion 6 of the detection element portion 3. Hence, when the ventilation hole 34 is looked inside from the side of the main passage 2, the back surface of the detection element portion 3 on which is mounted the intake-air temperature detection resistor 14 is visible. The intake-air temperature detection resistor 14 is positioned on an extension of the opening of the ventilation hole 34 and protrudes into the ventilation hole 34 from the plate 8. The intake-air temperature detection resistor 14 is therefore insusceptible to heat from the other portions. Hence, a response time required to detect a fluid temperature can be shorter than in a case where the ventilation hole 34 is absent.

Also, as is shown in FIG. 2, a plurality of insert conductors are provided to the base 9 by insert molding in such a manner that one end of each is exposed in the circuit storing portion 22 and the other end is exposed in the connector portion 24. The input and output terminals of the detection element portion 3 and electrode terminals of the circuit board 7 are wire-bonded using wires, and the electrode terminals of the circuit board 7 and one ends of the insert conductors are wire-bonded using wires. Wire-bonding is described as an example of an electrical connection method. However, electrical connection methods, such as welding and soldering, may be used instead. Further, a resin cover is bonded by an adhesive applied to a groove along an outer periphery of the circuit storing portion 22 and thereby closes the circuit storing portion 22. Bonding using an adhesive is described as an example of a closing method. However, other methods, such as fusing, may be used instead. Although it is not shown in the drawings, the circuit storing portion 22 is filled with encapsulation gel.

The flow measuring device 1 as above is formed of the main body portion 1a in which a base portion of the extension portion extended from the base 9 is formed of the plate 8 and the cover 35 laminated thereto, and the measurement passage forming portion 1b formed of the plate 8 used commonly and the measurement passage defining cover 10 laminated thereto. The base portion of the extension portion is shaped like a rectangular prism and the main body portion 1a (also the measurement passage forming portion 1b) has a rectangular cross section orthogonal to the extension direction. The main body portion 1a and the measurement passage forming portion 1b are enclosed within a projection plane of the joint portion in the extension direction.

As has been described, the main body portion 1a and the measurement passage forming portion 1b have rectangular cross sections orthogonal to the extension direction, and one wall surface as a long side of the rectangular outer periphery corresponds to the back surface of the plate 8 and the other wall surface corresponds to the outer surfaces of the cover 35 and the measurement passage defining cover 10. Further, the inlet 25 of the measurement passage 4 is provided to a short side of the rectangular outer periphery of the cross section of the measurement passage forming portion 1b orthogonal to the extension direction in the end face in the upper stream of the passage in close proximity to the tip end of the plate 8 in the upper stream of the passage. The outlet 33 of the measurement passage 4 is provided to the end face located downstream of the same tip end portion in the passage.

As is shown in FIG. 1, the flow measuring device 1 is attached as the main body portion 1a is inserted into the insertion hole so as to extend into the main passage 2 and the flange portion 36 of the joint portion is fastened and fixed to the flange portion 36 of the main passage 2 with screws 37. The flow measuring device 1 is plugged in the main passage 2 in such a manner that the wall surface formed of the long side of the rectangular outer periphery of the cross section orthogonal to the extension direction of the main body portion 1a (also the measurement passage forming portion 1b) is substantially parallel to the main stream flow direction A of the fluid being measured flowing through the main passage 2 while the other wall surface formed of the short side of the rectangular outer periphery of the cross section of the main body portion 1a is oriented toward the upper stream so as to be orthogonal to the flow direction A. An O-ring is interposed between the joint portion and the insertion hole to ensure airtightness. Herein, the outlet 25 of the measurement passage 4 opens in close proximity to the end of the surface orthogonal to the main stream flow direction A on the extension side into the main passage 2. The outlet 33 opens in the end face on the extension side into the main passage 2, which is a plane parallel to the main stream flow direction A.

The fluid being measured flowing through the main passage 2 flows into the measurement passage 4 from the inlet 25. The fluid being measured flows through the first passage portion 26 along the main stream flow direction A until the flow direction is bent by substantially 90° at the first bent portion 27 and flows through the second passage portion 28 in a direction orthogonal to the main stream flow direction A. Subsequently, the flow direction of the fluid being measured is bent by substantially 90° at the second bent portion 29 and the fluid being measured flows through the third passage portion 30, in which the measurement position is set, in the main stream flow direction A and flows along the surface of the detection element portion 3. Thereafter, the flow direction of the fluid being measured is bent by substantially 90° at the third bent portion 31 and the fluid being measured is discharged into the main passage 2 from the outlet 33.

As is shown in FIG. 2, power from the outside is supplied to the control circuit formed in the circuit board 7 from the connector portion 24 via the insert conductors. As is shown in FIG. 3, the control circuit is formed of the intake-air temperature detection circuit portion 7a, the heating temperature control circuit portion 7b, and the flow rate detection circuit portion 7c.

As is shown in FIG. 3, the intake-air temperature detection circuit portion 7a supplies a current to the intake-air temperature detection resistor 14 of the detection element portion 3 from the constant current source 20 and supplies a voltage across the intake-air temperature detection resistor 14 to the intake-air temperature signal adjustment portion 21a. The voltage is adjusted to have a predetermined characteristic in the intake-air temperature signal adjustment portion 21a and outputted from the output terminal as an intake-air temperature signal.

Also, the heating temperature control circuit portion 7b forms a bridge circuit from the heating resistor 11 and the temperature compensation resistor 13 of the detection element portion 3, and the fixed resistors 18 of the circuit board 7. The heating temperature control circuit portion 7b performs feedback control to maintain the heating temperature constant by detecting a differential signal of the bridge circuit using the operational amplifier 19 and supplying a current via the transistor 17.

The flow rate detection circuit portion 7c forms abridge circuit from the constant voltage power supply 16, the heating temperature detection resistors 12 installed upstream and downstream of the heating resistor 11 in the flow direction of the fluid being measured, resistance values of which vary with thermal influences of the heating resistor 11, and the fixed resistors 18. A differential signal corresponding to the flow rate is detected by the bridge circuit and the detected differential signal is supplied to the flow rate signal adjustment portion 21b. The differential signal is adjusted to have a predetermined characteristic in the flow rate signal adjustment portion 21b and outputted from the output terminal as a flow rate signal.

FIG. 5 is a view showing response characteristics of the intake-air temperature detection portion 6 in the flow measuring device 1 according to the first embodiment of the invention, and shows a change of a detection temperature of the intake-air temperature detection portion 6 in response to a temperature change of the fluid being measured.

In FIG. 5, a solid line (A) indicates an internal temperature of the main passage 2 when a temperature of the fluid being measured changes and shows a target waveform to be measured in the measurement passage 4. Data indicated by a rough broken line (B) of FIG. 5 is the data obtained by the flow measuring device 1 provided with the ventilation hole 34 of the invention. A fine broken line (C) of FIG. 5 indicates comparative data when the ventilation hole 34 is absent. The data reveals that a time until an equilibrium is established is longer than in the cases of the lines (A) and (B) and a temperature when the equilibrium is established is the lowest. In other words, the flow measuring device 1 of the invention provided with the ventilation hole 34 can obtain data close to an actual temperature change of the fluid being measured.

As is indicated by the fine broken line (C) of FIG. 5, in the fluid measuring device without the ventilation hole 34, an internal temperature of the measurement passage 4 rises gradually in comparison with an internal temperature of the main passage 2. This is because a heat capacity in the measurement passage 4 formed by molding is so large that a response lags behind a temperature change of the fluid being measured in the main passage 2 and an exact intake-air temperature cannot be detected.

Even when a heat capacity of the intake-air temperature detection portion 6 is reduced, for example, by adopting a diaphragm structure to the substrate portion of the intake-air temperature detection portion 6 and a response speed of the intake-air temperature detection portion 6 to a temperature change is enhanced, an exact intake-air temperature cannot be detected, either, because there is an error in the internal temperature of the measurement passage 4.

According to the first embodiment, however, the ventilation hole 34 allowing the main passage 2 and the third passage portion 30 of the measurement passage 4 to communicate is provided so as to penetrate through the plate 8 and a part of the intake-air temperature detection portion 6 of the detection element portion 3 is installed in the ventilation hole 34. When this structure is adopted, the fluid being measured on the side of the main passage 2 is allowed to pass by the intake-air temperature detection portion 6 of the detection element portion 3 from the ventilation hole 34. When configured in this manner, as is indicated by the line (B) of FIG. 5, a measurement error of a temperature of the intake-air temperature detection portion 6 from a true value, that is, the internal temperature of the main passage 2 indicated by the line (A), can be reduced. Hence, a speed of response to a temperature change of the fluid being measured can be improved.

With reference to FIG. 2 and FIG. 4B, the above has described, by way of example, that an opening dimension of the ventilation hole 34 is set to a size large enough to surround the region of the detection element portion 3 where the intake-air temperature detection resistor 14 is installed and a peripheral space and that the opening is formed in a rectangular shape. It goes without saying, however, that the ventilation hole 34 can be of any shape other than a rectangle.

Second Embodiment

Figure 6:
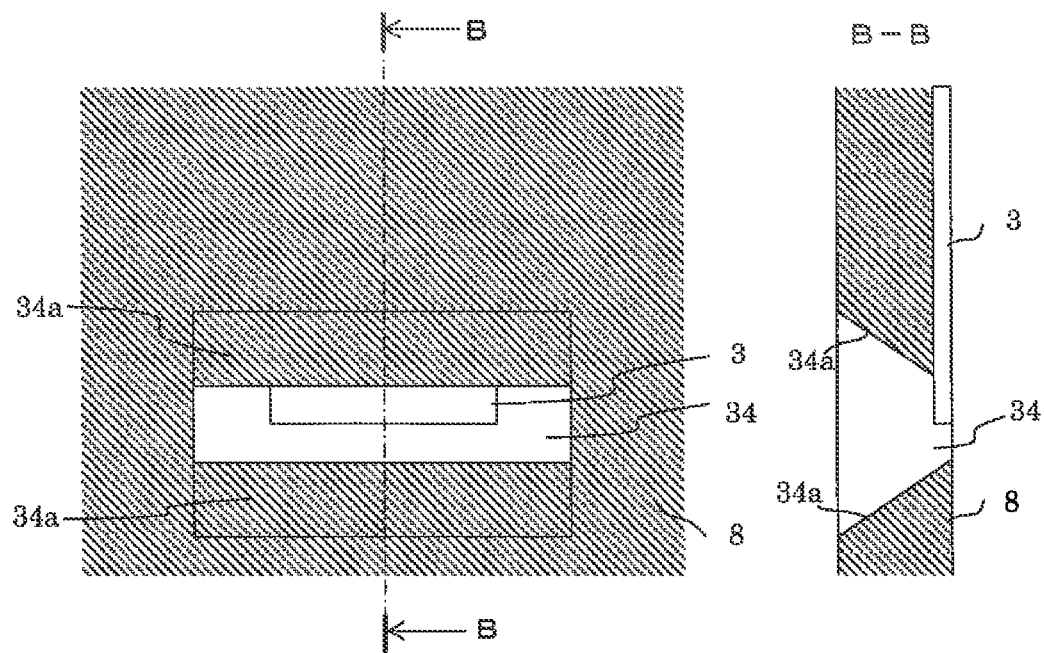
FIG. 6A is an enlarged view of a major portion on a main passage side showing a ventilation hole and a periphery thereof according to a second embodiment of the invention.
FIG. 6B is a cross section taken along the line B-B of FIG. 6A.

The first embodiment above has described a case where the ventilation hole 34 opens in a direction perpendicular to the plane of the plate 8 while maintaining a constant opening dimension in a thickness direction of the plate 8. A second embodiment will describe a modification of the ventilation hole 34 using FIGS. 6A and 6B. FIG. 6A is an enlarged view of a major portion when a ventilation hole 34 of the second embodiment and a periphery thereof are viewed from the side of the main passage 2. FIG. 6B is a cross section taken along a line B-B of FIG. 6A.

As is shown in FIGS. 6A and 6B, the ventilation hole 34 is configured in such a manner that the inner sides of the ventilation hole 34 form inclined surfaces 34a so that an opening area becomes larger on the side of the main passage 2, that is, the back surface side of the plate 8, than the side of the measurement passage 4 (one main surface side) of the plate 8 where the detection element portion 3 is formed. In a case shown in FIGS. 6A and 6B, of the inner surfaces of the ventilation hole 34 having a rectangular cross section, a top surface and a bottom surface form the inclined surface 34a. Inclined directions are vertically symmetrical. The rest of the configuration is the same as that of the first embodiment above.

The second embodiment has a structure that allows the fluid being measured to readily flow from the main passage 2 to the measurement passage 4 by forming a passage sectional area of the ventilation hole 34 in such a manner so as to increase from the measurement passage 4 toward the main passage 2. Hence, a flow rate of the fluid being measured in the ventilation hole 34 can be increased in comparison with a case where the inclined surfaces 34a are not provided. Further, in order to provide the inclined surface 34a, a part of the plate 8 on the periphery of the intake-air temperature detection portion 6 is scraped off. Hence, a heat capacity on the periphery of the detection portion can be smaller than in the case of the ventilation hole 34 having a uniform opening dimension as in the first embodiment above. In this manner, the intake-air temperature detection portion 6 can enhance a speed of response to a temperature change of the fluid being measured. It goes without saying, however, that a modification, such as forming only one of a plurality of inner surfaces forming the ventilation hole 34 as the inclined surface 34a, can be made.

Third Embodiment

The first and second embodiments above have described the technique of exposing the back surface of the intake-air temperature detection resistor 14 toward the main passage 2 by providing the ventilation hole 34 penetrating through the plate 8 (wall surface portion) serving as the mount surface, so that the intake-air temperature detection resistor 14 of the detection element portion 3 is insusceptible to heat from the other components.

The flow measuring device 1, however, has another problem to be solved other than an improvement of a response speed. The problem is penetration of rain water into the measurement passage 4.

For example, assume that the flow measuring device 1 is mounted to an automobile. When the automobile runs in the rain behind a vehicle running by splashing up a large volume of water drops from the wheels or runs in heavy rain, fine water drops readily penetrate into the flow measuring device 1 measuring intake air of the automobile by way of an intake air filtering device. When the water drops adhere onto the flow rate detection portion 5 and the intake-air temperature detection portion 6, an output becomes abnormal until the water drops evaporate.

The flow measuring device described in the related art (Patent Document 3 and Patent Document 4) is configured in such a manner that water penetrating into the measurement passage is discharged to the main passage through a hole penetrating though the measurement passage and the main passage. However, no consideration is given to a configuration that prevents water adhering to the wall surface on the main passage side from penetrating into the measurement passage from this penetrating hole.

A third embodiment will describe a flow measuring device capable of preventing penetration of water into the measurement passage 4 from the side of the main passage 2 besides being capable of improving a response speed of the intake-air temperature detection portion 6 to an intake-air temperature.

Figure 7:
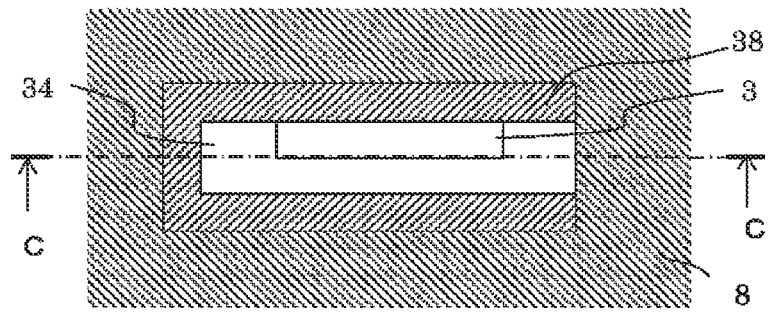
FIG. 7 is an enlarged view of a major portion on a main passage side showing a ventilation hole and a periphery thereof according to a third embodiment of the invention.
Figure 8:
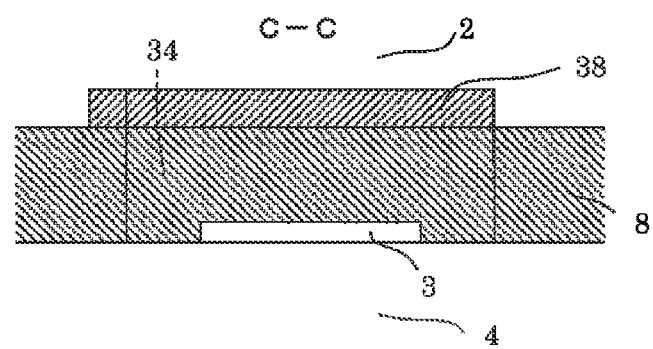
FIG. 8 is a cross section taken along the line C-C of FIG. 7.

The flow measuring device 1 of the third embodiment is shown in FIG. 7 and FIG. 8. FIG. 7 is an enlarged view of a major portion on the side of the main passage 2, that is, the ventilation hole 34 and a periphery thereof. FIG. 8 is a cross section taken on the line C-C of FIG. 7. As are shown in these drawings, a convex portion 38 protruding toward the main passage 2 to prevent penetration of water into the ventilation hole 34 is provided to an opening end of the ventilation hole 34 on the side of the main passage 2 in the measurement passage forming portion 1b. The convex portion 38 can be formed by upraising a part of the wall surface of the plate 8 in close proximity to the opening on the side of the main passage 2. Alternatively, the convex portion 38 can be formed by another method, such as bonding and fixing a separate member.

According to the third embodiment, even when fine water drops penetrate into the measurement tube 100 by way of the intake air filtering device and adhere onto the wall surface of the flow measuring device 1 on the side of the main passage 2, because the convex portion 38 is formed so as to rise up on the periphery of the opening of the ventilation hole 34, the water drops cannot penetrate into the measurement passage 4 from the ventilation hole 34. Hence, because water in the tube 100 does not adhere onto the intake-air temperature detection portion 6 of the detection element portion 3, an error does not occur in an intake-air temperature detection. The ventilation hole 34 is not closed with water, either.

As has been described, when the flow measuring device 1 of the third embodiment is used, penetration of water into the ventilation hole 34 can be prevented by an action of the convex portion 38 provided to the wall surface in close proximity to the opening of the ventilation hole 34 on the side of the main passage 2. Hence, not only can a flow rate and an intake-air temperature be detected with high accuracy, but also high robustness and high reliability can be ensured.

As are shown in FIG. 7 and FIG. 8, by taking a flow of the fluid being measured into consideration, the convex portion 38 is formed in an U shape conforming to the ventilation hole 34 having a rectangular opening shape along one side on the upper stream side of the main passage 2 and two sides connected to this one side and extending along the passage. The convex portion 38 is not formed along one side on the lower stream side of the passage. It goes without saying, however, that a modification can be made in this regard and an opening shape of the ventilation hole 34 can be changed, too.

Fourth Embodiment

Figure 9:
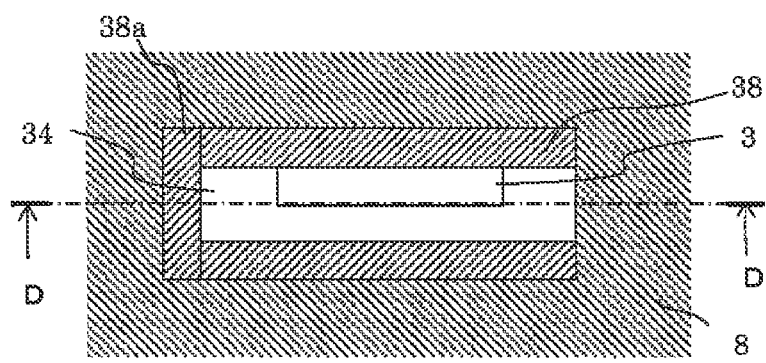
FIG. 9 is an enlarged view of a major portion on a main passage side showing a ventilation hole and a periphery thereof according to a fourth embodiment of the invention.
Figure 10:
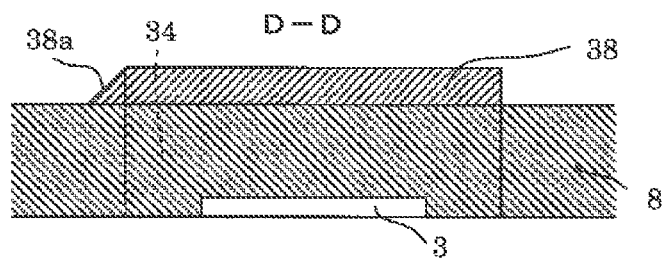
FIG. 10 is a cross section taken along the line D-D of FIG. 9.

A flow measuring device 1 according to a fourth embodiment of the invention will now be described. The convex portion 38 preventing penetration of rain water described in the third embodiment above is of a protruding shape protruding from the back surface of the plate 8 while maintaining a uniform dimension. The fourth embodiment will describe a modification of the convex portion 38. FIG. 9 is an enlarged view of a major portion on the side of the main passage 2, that is, a ventilation hole 34 and a periphery thereof in the flow measuring device 1 of the fourth embodiment. FIG. 10 is a cross section taken along the line D-D of FIG. 9.

The convex portion 38 located upstream of the ventilation hole 34 in the main passage 2 has an inclined portion 38a. The inclined portion 38a is of a shape with an inclined surface so that an amount of protrusion smoothly increases toward downstream of the ventilation hole 34. The rest of the configuration is the same as that of the third embodiment above.

In addition to the advantages of the third embodiment described above, the flow measuring device 1 of the fourth embodiment can suppress a disturbance of the flow of the fluid being measured occurring upstream of the convex portion 38 owing to the inclined portion 38a provided to the convex portion 38 formed upstream of the ventilation hole 34 penetrating through the measurement passage 4 and the main passage 2 in the wall surface in close proximity to the opening on the side of the main passage 2. Further, a disturbance of the flow of the fluid being measured flowing from the main passage 2 into the measurement passage 4 via the ventilation hole 34 can be suppressed. Hence, a flow rate can be detected with high accuracy.

Fifth Embodiment

A flow measuring device 1 according to a fifth embodiment of the invention will be now be described using FIG. 11 and FIG. 12. The fourth embodiment above has described a case where the convex portion 38 preventing penetration of rain water includes the inclined portion 38a with a varying protrusion height. The third and fourth embodiments above have described a case where the convex portion 38 with a uniform width is provided on the periphery (three sides except for one downstream side) of the ventilation hole 34 on the side of the main passage 2 and an outer peripheral shape of the convex portion 38 is one size larger than the opening shape of the ventilation hole 34. The fifth embodiment will describe a case where an outer peripheral shape of the convex portion 38 provided on the periphery of the ventilation hole 34 is inclined on an upper stream side of the passage.

Figure 11:
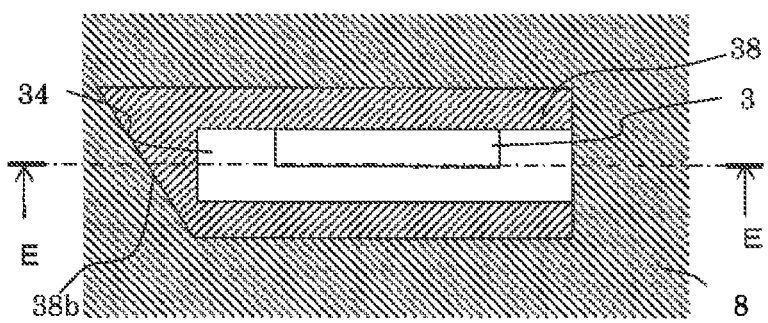
FIG. 11 is an enlarged view of a major portion on a main passage side showing a ventilation hole and a periphery thereof according to a fifth embodiment of the invention.
Figure 12:
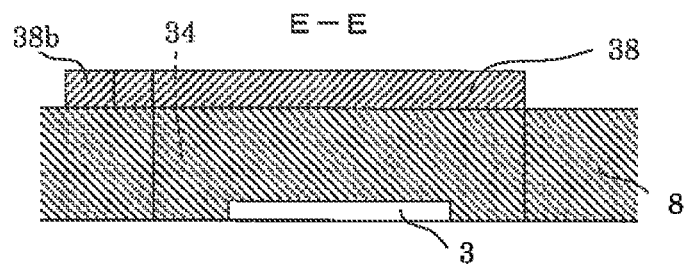
FIG. 12 is a cross section taken along the line E-E of FIG. 11.

FIG. 11 is an enlarged view of a major portion on the side of the main passage 2, that is, a ventilation hole 34 and a periphery thereof in the flow measuring device 1 of the fourth embodiment. FIG. 12 is a cross section taken along the line E-E of FIG. 11. As are shown in FIG. 11 and FIG. 12, the flow measuring device 1 of the fifth embodiment is characterized in that when the measurement passage forming portion 1b is installed downward so as to extend into the tube 100 from the main body portion 1a, an outer peripheral shape of the convex portion 38 located upstream of the ventilation hole 34 in the main passage 2 is of a shape having an inclined portion 38b that inclines downward from upstream to downstream in the main passage 2. The rest of the configuration is the same as that of the first embodiment above.

In the fifth embodiment, by providing the convex portion 38 with the inclined portion 38b whose outer peripheral shape on the upper stream side in the passage is inclined, when water splashed to the ventilation hole 34 from upstream in the main passage 2 adheres onto the convex portion 38, the water is guided to the outside of the ventilation hole 34 along the inclined portion 38b inclined from upstream to downstream. Hence, penetration of water into the ventilation hole 34 can be prevented. Further, not only can a disturbance of a flow of the fluid being measured occurring at the inclined portion 38b located upstream of the ventilation hole 34 be suppressed, but also a disturbance of a flow of the fluid being measured flowing from the ventilation hole 34 into the measurement passage 4 can be suppressed. Hence, a flow rate can be detected with high accuracy.

Sixth Embodiment

Figures 13A, 13B:
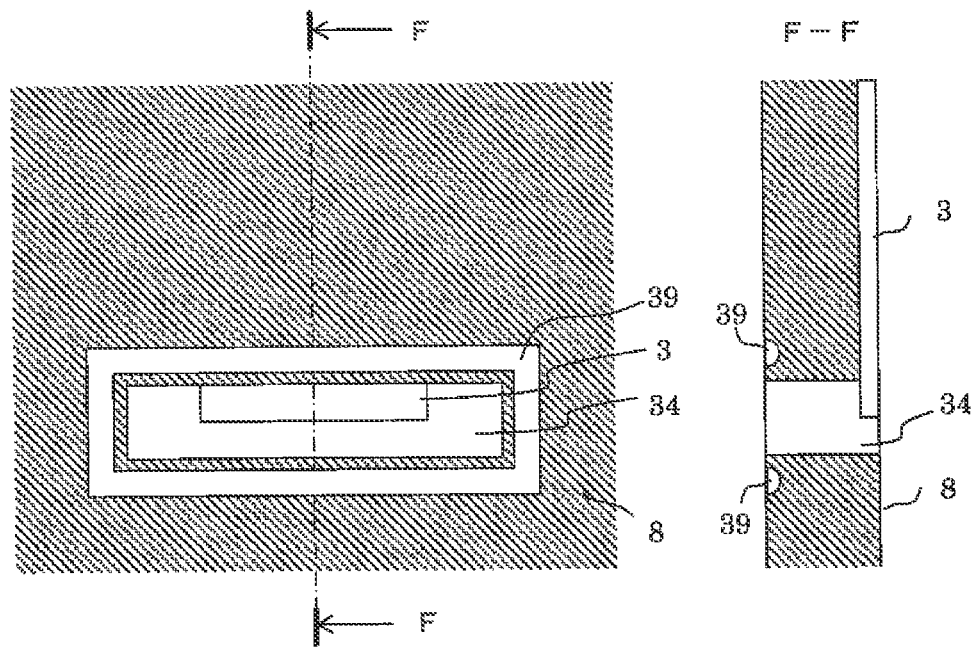
FIG. 13A is an enlarged view of a major portion on a main passage side showing a ventilation hole and a periphery thereof according to a sixth embodiment of the invention.
FIG. 13B is a cross section taken along the line F-F of FIG. 13A.

The third through fifth embodiments above have described a case where the convex portion 38 is provided on the periphery of the opening of the ventilation hole 34 on the side of the main passage 2. A different structure also capable of suppressing penetration of rain water into the measurement passage 4 will be described using FIGS. 13A and 13B as a sixth embodiment. FIG. 13A is an enlarged view of a major portion when a ventilation hole 34 of the sixth embodiment and a periphery thereof are viewed from the side of the main passage 2. FIG. 13B is a cross section taken along the line F-F of FIG. 13A. In the flow measuring device 1 of the sixth embodiment, the measuring passage forming portion 1b includes a concave portion 39 recessed from the surface of the plate 8 (wall surface portion) on the periphery of an opening end of the ventilation hole 34 on the side of the main passage 2. The rest of the configuration is the same as the configuration of the first embodiment above.

According to the flow measuring device 1 of the sixth embodiment, by providing the concave portion 39 in the wall surface in close proximity to the opening of the ventilation hole 34 on the side of the main passage 2, a state in which water drops are collected in the concave portion 39 and allowed to flow downstream along the flow of the fluid can be achieved. Hence, penetration of water into the ventilation hole 34 can be prevented. Because a protruding portion like the convex portion 38 is not formed on the back surface of the plate 8, neither a flow of the fluid being measured is disturbed nor a pressure loss is increased. Hence, a flow rate and an intake-air temperature can be detected with high accuracy and high robustness can be ensured.

It should be appreciated that the respective embodiments of the invention can be combined without any restriction and the respective embodiments can be modified or omitted appropriately within the scope and sprit of the invention.

Various modifications and alterations of this invention will be apparent to those skilled in the art without departing from the scope and spirit of this invention, and it should be understood that this is not limited to the illustrative embodiments set forth herein.

What is claimed is:

1. A flow measuring device, comprising:
   a main body portion extended into a main passage in which a fluid being measured flows and provided with a circuit storing portion internally;
   a measurement passage forming portion formed on an extension side of the circuit storing portion in the main body portion and provided with a measurement passage in which to let a part of the fluid being measured flow;
   a detection element portion provided on an inner surface side of a wall surface portion defining the measurement passage of the measurement passage forming portion, and provided with an intake-air temperature detection portion detecting a temperature of the fluid being measured and a flow rate detection portion detecting a flow rate, both of which are formed on one main surface of a same substrate; and
   a ventilation hole penetrating through the wall surface portion of the measurement passage forming portion and allowing the main passage and the measurement passage to communicate, wherein:
   the detection element portion is installed so that an end thereof protrudes into the ventilation hole; and
   a back surface of the end of the detection element portion where the intake-air temperature detection portion is formed is exposed toward the main passage.

2. The flow measuring device according to claim 1, wherein:
   the wall surface portion defining the measurement passage is installed to be parallel to a flow direction of the main passage and the ventilation hole opens perpendicularly to the flow direction.

3. The flow measuring device according to claim 1, wherein:

an intake-air temperature detection resistor forming the intake-air temperature detection portion is installed on an extension of the ventilation hole.

4. The flow measuring device according to claim 3, wherein:
the ventilation hole is opened in a size large enough to surround a region of the detection element portion where the intake-air temperature detection resistor is installed and a peripheral space.

5. The flow measuring device according to claim 1, wherein:
the ventilation hole is formed in such a manner that an inner surface of the ventilation hole inclines to make an opening area larger on a side of the main passage than on a side of the measurement passage.

6. The flow measuring device according to claim 1, wherein:
the measurement passage forming portion includes a convex portion protruding toward the main passage in an opening end of the ventilation hole on a side of the main passage.

7. The flow measuring device according to claim 6, wherein:
the convex portion located upstream of the ventilation hole in the main passage is of a shape in which a surface inclines so that an amount of protrusion smoothly increases toward downstream of the ventilation hole.

8. The flow measuring device according to claim 6, wherein:
in a case where the measurement passage forming portion is installed so as to extend downward from the main body portion, an outer peripheral shape of the convex portion located upstream of the ventilation hole in the main passage has an inclined portion inclined downward from upstream to downstream in the main passage.

9. The flow measuring device according to claim 1, wherein:
the measurement passage forming portion includes a concave portion recessed from a surface of the wall surface portion on a periphery of an opening end of the ventilation hole on a side of the main passage.

* * * * *